US012436763B2

United States Patent

(12) United States Patent
Eckert et al.

(10) Patent No.: US 12,436,763 B2
(45) Date of Patent: Oct. 7, 2025

(54) LOOKUP TABLE (LUT) VECTOR INSTRUCTION

(71) Applicant: Advanced Micro Devices, Inc., Santa Clara, CA (US)

(72) Inventors: Yasuko Eckert, Redmond, WA (US); Vadim Vadimovich Nikiforov, Berkeley, CA (US); Gabriel H. Loh, Bellevue, WA (US); Bradford Beckmann, Redmond, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 235 days.

(21) Appl. No.: 18/128,963

(22) Filed: Mar. 30, 2023

(65) Prior Publication Data

US 2024/0329984 A1 Oct. 3, 2024

(51) Int. Cl.
*G06F 9/30* (2018.01)

(52) U.S. Cl.
CPC ........ *G06F 9/30038* (2023.08); *G06F 9/3001* (2013.01); *G06F 9/30109* (2013.01)

(58) Field of Classification Search
None
See application file for complete search history.

(56) References Cited

U.S. PATENT DOCUMENTS

2023/0050062 A1* 2/2023 Hung .................. G06F 9/30043

* cited by examiner

*Primary Examiner* — Scott C Sun
(74) *Attorney, Agent, or Firm* — FIG. 1 Patents

(57) ABSTRACT

An electronic device includes processing circuitry that executes a lookup table (LUT) vector instruction. Executing the lookup table vector instruction causes the processing circuitry to acquire a set of reference values by using each input value from an input vector as an index to acquire a reference value from a reference vector. The processing circuitry then provides the set of reference values for one or more subsequent operations. The processing circuitry can also use the set of reference values for controlling vector elements from among a set of vector elements for which a vector operation is performed.

20 Claims, 8 Drawing Sheets

LOOKUP TABLE (LUT) VECTOR INSTRUCTION

BACKGROUND

Related Art

Many electronic devices include processing circuitry (e.g., a central processing unit, a graphics processing unit, etc.) that executes program code instructions, or, more simply, "instructions," that cause the processing circuitry to perform corresponding operations. There are a wide variety of different types of instructions and operations caused by the instructions, such as logical, mathematical, bitwise, control, memory access, and communication operations. In some cases, the instructions include vector instructions, which are instructions that cause vector processing circuitry to perform vector operations on or using data from multiple elements of input vectors in parallel. For example, vector instructions can cause processing circuitry to perform mathematical operations (e.g., add, multiply, etc.) in parallel on or using data from each element in an N-element input vector (where N=32, 64, or another number). Due to the parallel processing, it can be significantly more efficient to perform certain operations using vector instructions rather than performing the same operations using non-vector or "scalar" instructions. Although vector instructions can be more efficient than scalar instructions for some operations, in certain cases the overhead associated with using vector instructions negates some or all of the efficiency of using the vector instructions.

BRIEF DESCRIPTION OF THE FIGURES

Throughout the figures and the description, like reference numerals refer to the same figure elements.

DETAILED DESCRIPTION

Figure 1:
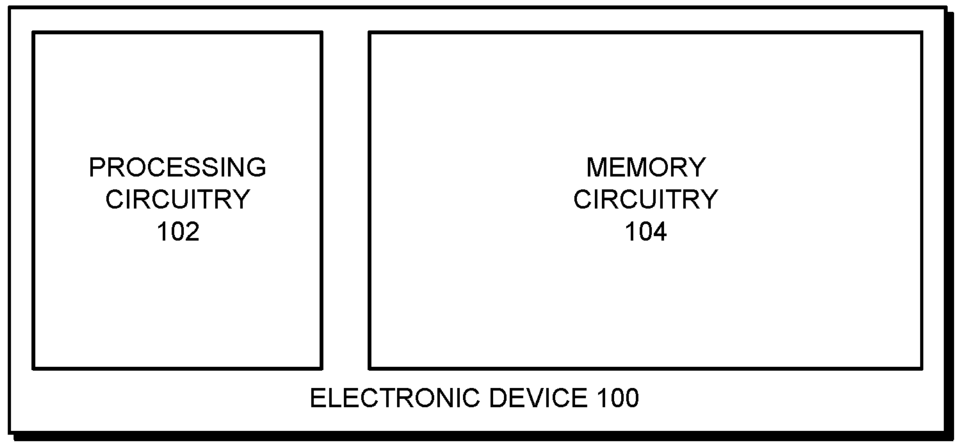
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

Terminology

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or part thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Substantially in parallel: refers to two or more operations or other occurrences that are intended to happen at the same time or simultaneously. For example, parallel processing circuitry such as vector processing circuitry can perform a given operation on or using data from each of two or more (and possibly many) elements of an input vector substantially in parallel. For instance, two or more instances of vector lane circuitry in the vector processing circuitry may commence performing the given operation on or using data from respective elements of an input vector based on a given edge or level of a controlling clock signal and/or control signal, a timer expiration, etc.

In the described implementations, an electronic device includes a processor having processing circuitry (e.g., in a central processing unit, a graphics processing unit, etc.) that can execute program code instructions, or "instructions," that cause the processing circuitry to perform corresponding operations. Among the instructions that can be executed by the processing circuitry are vector instructions. The vector instructions are instructions that cause vector processing circuitry in the processing circuitry to perform one or more specified operations substantially in parallel on or using data from vector elements of input vectors. For example, vector instructions can cause the vector processing circuitry to multiply a numerical value in each element of a vector by a scalar value, add data in elements of two or more vectors together, perform logical or bitwise operations on data in elements of a vector, etc.

In some cases, the operations of vector instructions are performed on or using data in less than all of elements of input vectors—i.e., are to be performed only on or using data in some of the available elements of the input vectors. For example, the operation(s) of a vector instruction may only be performed for vector elements for which the data meets a specified condition, such as being a prime number, having a particular character value, etc. In some of these cases, the vector elements for which operation(s) of a vector instruction are to be performed is determined dynamically (i.e., at runtime, on the fly, etc.). In these cases, the processing circuitry can be responsible for determining elements of input vectors for which the operations are to be performed (or not). Continuing the example in which data in vector elements is to meet a specified condition, the processing circuitry executes one or more vector and/or scalar instructions to check the data in each vector element to determine if the data meets the specified condition. Based on the outcome of the checks, the processing circuitry can set a vector mask register to identify elements of the input vector where the data meets the specified condition—and thus elements of the input vector for which the operation is to be performed. The vector processing circuitry then uses the vector mask register to control elements of the input vector for which the specified operation is performed. Although this technique ensures that operations of a vector instruction are performed for appropriate elements of the input vector, there are a number of issues with this technique. First, the number of vector and/or scalar instructions that are executed to determine whether the data in vector elements meets a specified condition can be large, particularly for more complex conditions. Second, vector processing circuitry typically includes only a small number of vector mask registers and using the vector mask register as described above limits other operations that might be performed using the vector mask register.

In the described implementations, the processing circuitry supports a lookup table vector instruction, which can be called a "LUT vector instruction." The LUT vector instruction, when executed by vector processing circuitry, causes the vector processing circuitry to check a specified condition for input values in elements of an input vector and provide an output that indicates whether each set of the input values meets the specified condition. For example, the specified condition can be whether an integer input value is a prime number from a given set of prime numbers, is a multi-bit character value matches an alphabetic character in a designated set of alphabetic characters, etc. The LUT vector instruction uses a reference vector for checking whether each set of the input values in the elements of the input vector meets the specified condition. The reference vector includes a number of elements, each element being associated with a respective index. Each of the reference vector elements stores a reference value that is a result/outcome of evaluating the specified condition for the index value associated with that element. The reference vector therefore includes elements with reference values that each identify whether the respective index meets the specified condition. Executing the LUT vector instruction causes the vector processing circuitry to use the input values from the input vector as indices for acquiring, substantially in parallel, reference values from a corresponding elements of the reference vector (i.e., from elements of the reference vector having matching indices). In some implementations, therefore, executing the LUT vector instruction causes vector processing circuitry to "look up," substantially in parallel, a set of reference values by using each input value from the input vector register as an index to acquire a corresponding reference value from the reference vector register.

In some implementations, following execution of the LUT vector instruction, the vector processing circuitry uses the set of reference values generated by the LUT vector instruction for controlling particular vector elements in a set of vector elements for which a vector operation is performed. That is, based on a corresponding reference value, the vector processing circuitry can perform (or not) the vector operation on or using data in each element of the input vector and/or other vector(s). In some implementations, continuing the example from above, the vector processing circuitry performs a vector operation on or using data in vector elements that are identified by the corresponding reference value as meeting a specified condition. In contrast, the vector processing circuitry does not perform the vector operation on or using data in vector elements that are identified by the corresponding reference value as not meeting the specified condition. In some implementations, the reference values are used directly for controlling the vector elements for which the vector operation is performed. For example, the reference values can be fed as control signals into control circuitry for respective vector lane circuitry in the vector processing circuitry to control whether and/or how the respective vector lane circuitry performs the vector operation on or using data in a corresponding vector element. In some implementations, the reference values are used indirectly for controlling the vector elements for which the vector operation is performed. For example, the reference values can be used for setting values in elements of a vector mask register, the values in the vector mask register being fed as control signals into control circuitry for respective vector lane circuitry in the vector processing circuitry to control whether and/or how the respective vector lane circuitry performs the vector operation on or using data in a corresponding vector element.

In some implementations, an entity (e.g., the processing circuitry, other processing circuitry, a user, etc.) sets the reference values in the reference vector in advance of when the LUT vector instruction is executed. "In advance" as used herein includes a time immediately before the reference vector is used or some other time. For example, in some implementations, the reference values in the reference vector can be set seconds, days, months, etc. in advance and stored in a storage element (e.g., in a memory of the electronic device, on a removable storage element, etc.). For instance, a programmer can include the reference vector in program code that is loaded onto the electronic device as part of a software program installation. The reference vector can then be retrieved and stored in a vector register in the vector processing circuitry to enable the execution of the LUT vector instruction. When setting the reference values in the reference vector, the entity determines an outcome of evaluating a specified condition for an index value associated with each element of the reference vector (e.g., is the index value a prime number, does the index value have a specified pattern of bits, etc.). The processing circuitry then stores a reference value representing the outcome for each index value into a respective element of the reference vector. For example, in some implementations, the reference values are one-bit values that are set to a first value (e.g., a logical high value or "one" value) when the index meets the specified condition and a second value (e.g., a logical low value or "zero") otherwise. In some of these implementations, the processing circuitry can dynamically update existing reference values in reference vectors, such as by determining an outcome of evaluating an updated condition for the index value associated with each element of a reference vector. In these implementations, therefore, the reference vector can be updated at runtime or otherwise to use different specified conditions.

By using the LUT vector instruction and the reference vector for checking specified conditions for values in elements of input vectors and providing the outputs that indicate whether each of the input values meets the specified conditions, the described implementations can avoid the need for executing multiple instructions for checking conditions. In other words, the LUT vector instruction provides a single-instruction mechanism for generating an output that represents whether (or not) values in elements of input vectors meet specified conditions. By setting the reference values in reference vectors used by LUT vector instructions in advance, the described implementations can quickly execute the LUT vector instructions—and can reuse the reference vector for numerous instances of the LUT vector instruction for the same specified condition. By dynamically setting and/or updating the reference vector, the described implementations can adapt the reference vector to desired conditions on the fly. By using the set of reference values output from the LUT vector instruction directly as inputs for control circuitry in some implementations, there is less need for using vector mask registers (or other data storage elements) for controlling subsequent vector operations, which can reduce the demand for and pressure on the vector mask registers, as well as reducing the number of instructions for achieving the same functionality. By using the set of reference values indirectly in some implementations, such as setting vector mask registers or other storage elements, the LUT vector instruction is able to interface seamlessly with other/existing vector operations that rely on/use the vector mask registers or other storage elements. The LUT vector instruction can therefore improve the efficiency and performance of vector operations for processing circuitry, which helps to improve the overall performance of the processing circuitry, leading to increased user satisfaction with the processing circuitry.

FIG. 1 presents a block diagram illustrating an electronic device 100 in accordance with some implementations. As can be seen in FIG. 1, electronic device 100 includes processing circuitry 102 and memory circuitry 104. Generally, processing circuitry 102 and memory circuitry 104 are implemented in hardware, i.e., using corresponding integrated circuitry, discrete circuitry, and/or devices. For example, in some implementations, processing circuitry 102 and memory circuitry 104 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processing circuitry 102 and/or memory circuitry 104 perform operations for, dependent on, or associated with executing LUT vector instructions as described herein.

Figure 2:
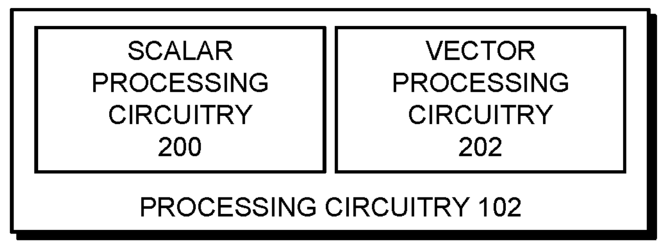
FIG. 2 presents a block diagram illustrating processing circuitry in accordance with some implementations.

Processing circuitry 102 is a functional block that performs computational, memory access, control, and/or other operations. For example, processing circuitry 102 can be or be included in a central processing unit (CPU), graphics processing unit (GPU), an accelerated processing unit (APU), a system on a chip (SOC), a field programmable gate array (FPGA), etc. FIG. 2 presents a block diagram illustrating processing circuitry 102 in accordance with some implementations. As can be seen in FIG. 2, processing circuitry 102 includes scalar processing circuitry 200 and vector processing circuitry 202. Scalar processing circuitry 200 is a functional block that performs computational, memory access, control, and/or other operations on and/or using scalar data. In some implementations, scalar processing circuitry 200 is or includes one or more arithmetic logic units (ALUs), combinational logic circuitry, control circuitry, memory access circuitry, load/store units, scalar register files, and/or other circuitry that performs the computational, memory access, control, and/or other operations on and/or using scalar data. Vector processing circuitry 202 is a functional block that performs computational, memory access, control, and/or other operations on and/or using vector data (i.e., vectors that include a number of vector elements, each vector element holding/storing respective data). In some implementations, vector processing circuitry 202 is or includes one or more arithmetic logic units (ALUs), combinational logic circuitry, control circuitry, memory access circuitry, load/store units, vector register files, and/or other circuitry that performs the computational, memory access, control, and/or other operations on and/or using vector data.

Memory circuitry 104 is a functional block that stores data for accesses by other functional blocks in electronic device 100. For example, in some implementations, memory circuitry 104 is or is included in an integrated circuit memory in which copies of data (e.g., 4 KiB pages of data, etc.) retrieved from mass storage (not shown) or newly created are stored for subsequent accesses by the other functional blocks. Memory circuitry 104 includes one or more arrays of memory circuitry such as fifth generation double data rate synchronous dynamic random-access memory (DDR5 SDRAM) and/or other types of memory circuitry, as well as control circuitry for handling accesses of the data stored in the memory circuitry. In some implementations, memory circuitry 104 is what has traditionally been regarded as a "main" memory in electronic device 100.

Electronic device 100 and processing circuitry 102 as shown in FIGS. 1-2 are simplified for illustrative purposes. In some implementations, electronic device 100 and/or processing circuitry 102 includes additional or different elements (i.e., functional blocks and/or devices) for performing the operations herein described and other operations. For example, electronic device 100 can include electrical power functional blocks or devices, networking functional blocks or devices, human interface functional blocks or devices (e.g., displays, touch sensitive input elements, speakers, etc.), input-output functional blocks or devices, etc. Generally, in the described implementations, electronic device 100 includes sufficient numbers and/or arrangements of functional blocks to perform the operations herein described.

Electronic device 100 can be, or can be included in, any electronic device that performs operations such as those described herein. For example, electronic device 100 can be or be included in desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

As described above, the described implementations include vector processing circuitry 202 that performs vector operations (e.g., mathematical, combinatorial, bitwise, etc.) on or using vector data. Vector processing circuitry 202 can perform the vector operations on or using data in two or more vector elements substantially in parallel. Using the vector processing circuitry to perform vector operations on data in two or more elements of a vector substantially in parallel can be a significant performance and timing improvement over other techniques for performing operations for multiple instances of data (e.g., using scalar program code loops, etc.).

Figure 3:
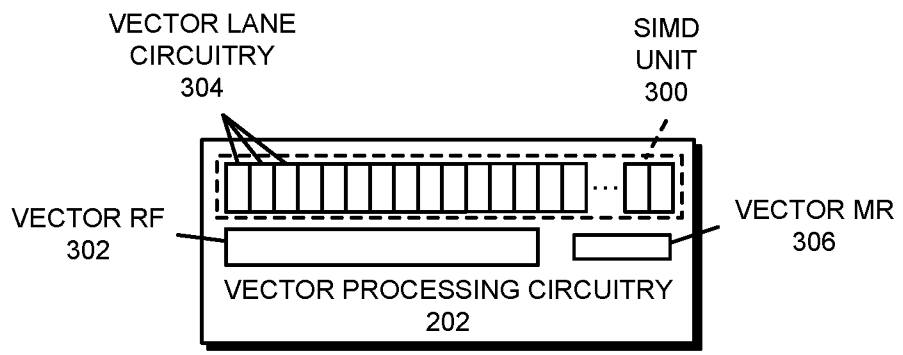
FIG. 3 presents a block diagram illustrating vector processing circuitry in accordance with some implementations.

FIG. 3 presents a block diagram illustrating vector processing circuitry 202 in accordance with some implementations. As can be seen in FIG. 3, vector processing circuitry 202 includes instruction multiple data (SIMD) unit 300. SIMD unit 300 includes multiple instances of vector lane circuitry 304, each instance of vector lane circuitry 304 including circuitry that can perform one or more vector operations on or using data from a respective vector element of an input vector or input vectors (only a few instances of the vector lane circuitry are labeled for clarity). In some implementations, each instance of vector lane circuitry 304 performs vector operations on or using data from "respective" vector elements, in that a given instance of vector lane circuitry 304 will perform the vector operation on or using data from the same single element of one or more input vectors. For example, the leftmost instance of vector lane circuitry 304 can perform vector operations on or using data from a leftmost element of one or more input vectors (which may be lowest-indexed elements of the one or more input vectors), the second from the leftmost instance of vector lane circuitry 304 can perform vector operations on or using data from second from the leftmost elements of one or more input vectors, and so forth. In some implementations, each input vector is of a first size (e.g., 64 bytes, 128 bytes, and/or another size) and each element of each input vector includes a portion of data from the input vector having a second size (e.g., 4 bytes, 8 bytes, or another size). In some implementations, the first and second sizes are data and/or operation dependent—and all input vectors and elements need not be the same first and/or second sizes.

Figure 4:
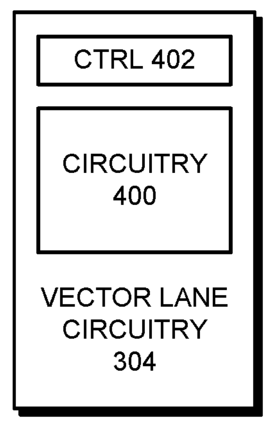
FIG. 4 presents a block diagram illustrating vector lane circuitry in accordance with some implementations.

FIG. 4 presents a block diagram illustrating an instance of vector lane circuitry 304 in accordance with some implementations. As can be seen in FIG. 4, vector lane circuitry 304 includes circuitry 400 and control (CTRL) 402. Circuitry 400 includes circuitry for performing vector operations on or using data from a corresponding vector element of one or more input vectors. As described above, depending on the implementation, circuitry 400 can include general purpose circuitry (e.g., execution pipelines, full-featured ALUs, etc.) and/or purpose-specific circuitry for performing the vector operations. Control 402 includes circuitry for controlling whether (or not) vector lane circuitry 304 performs a given vector operation. In some implementations, control 402 accepts one or more input signals or values (e.g., from circuitry 400, scalar processing circuitry 200, from a control element in vector processing circuitry 202 (not shown), and/or another source) that cause control 402 to allow circuitry 400 to perform a given vector operation—or to prevent circuitry 400 from performing the given vector operation. Note that "preventing" circuitry 400 from performing a given vector operation can mean that circuitry 400 performs no vector operation on the data. Alternatively, "preventing" circuitry 400 from performing a given vector operation can mean that circuitry 400 performs a different/alternate vector operation on the data-so that "preventing" the given vector operation does not mean that circuitry performs no vector operation.

Returning to FIG. 3, vector processing circuitry 202 also includes a vector register file (RF) 302. Vector register file 302 is a functional block that includes circuitry for a set of registers that are used by SIMD unit 300 (and/or other entities) for storing vector data to be used for vector operations. For example, in some implementations, vector register file 302 includes N M-byte registers, where N=64, 150, or another number and M=64, 80, or another number.

Vector processing circuitry 202 additionally includes vector mask register (MR) 306. Vector mask register 306 is a functional block that includes circuitry for a register for storing a mask value. The mask value can be used for identifying which instance(s) of vector lane circuitry 304 are to perform a given vector operation and/or for other purposes. For example, in some implementations, the vector mask register 306 includes a set of one-bit masking values that can be forwarded to control circuitry in instance(s) of vector lane circuitry 304 to cause or prevent the instance(s) of vector lane circuitry 304 from performing a given vector operation.

Vector processing circuitry 202 and vector lane circuitry 304 as shown in FIGS. 3-4, respectively, are simplified for illustrative purposes. In some implementations, vector processing circuitry 202 and/or vector lane circuitry 304 include additional or different elements for performing the operations herein described and/or other operations. For example, although only one SIMD unit 300 is shown in FIG. 3, in some implementations, there are multiple separate SIMD units. As another example, SIMD unit 300 (or each SIMD unit in an implementation that includes multiple SIMD units) may include a different number and/or arrangement of instances of vector lane circuitry 304. Generally, vector processing circuitry 202 and vector lane circuitry 304 include sufficient numbers and/or arrangements of elements to perform the operations herein described.

In the described implementations, an electronic device (e.g., electronic device 100) supports an instruction set architecture (ISA). The instruction set architecture includes rules, requirements, and guidelines regarding program code instructions to be supported, data types and registers to be available, and various other features and operations. Among the program code instructions of the instruction set architecture are one or more vector instructions. In the described implementations, the vector instructions include a lookup table vector instruction, called a LUT vector instruction. Generally, the LUT vector instruction is an instruction that, when executed by processing circuitry (e.g., vector processing circuitry 202), causes the processing circuitry to determine whether input values in an input vector meet a specified condition. For example, the specified condition can be whether the input values are prime numbers from among a set of prime numbers, whether the input values are divisible by three, whether each input value is a character from among a given set of characters, and/or another condition. The LUT vector instruction does this by using each of the input values as an index to acquire, substantially in parallel, a reference value from a reference vector. The reference values indicate whether (or not) the input value meets the specified condition, as is described in more detail below. The LUT vector instruction then provides the reference values to be used for subsequent operations. In other words, the LUT vector instruction provides an output that is or includes a vector or other listing of the reference values indicating whether (or not) respective input values meet the specified condition, based upon which one or more subsequent vector operations are (or are not) performed.

Figure 5:
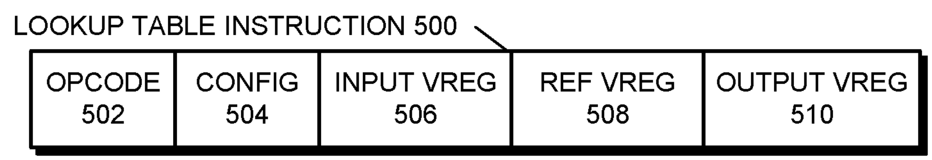
FIG. 5 presents a block diagram illustrating a format for a lookup table (LUT) vector instruction in accordance with some implementations.

FIG. 5 presents a block diagram illustrating a format for the lookup table (LUT) vector instruction 500 in accordance with some implementations. As can be seen in FIG. 5, LUT vector instruction 500 includes a number of fields (i.e., parts, subsections, etc.), each field being or including one or more bits that provide information about or for LUT vector instruction 500. Generally, when executing the LUT vector instruction, the vector processing circuitry (or other circuitry, such as decoding circuitry in processing circuitry 102 (not shown)) reads information from each of the fields and uses the information for and when performing the operations of LUT vector instruction 500. The fields include opcode 502, configuration (CONFIG) 504, input vector register (VREG) 506, reference vector register (REF VREG) 508, and output vector register (VREG) 510. Opcode 502 includes information for identifying the LUT vector instruction 500 from among other instructions in the instruction set architecture. Config 504 includes flags, settings, controls, and/or other information used when executing LUT vector instruction 500 (e.g., for controlling or configuring the vector processing circuitry for executing a given instance of LUT vector instruction 500, etc.). Input vector register 506 includes information identifying a vector register in which an input vector for LUT vector instruction 500 is stored from among a set of available vector registers. Reference vector register 508 includes information identifying a vector register in which a reference vector for LUT vector instruction 500 is stored from among a set of available vector registers. Output vector register (VREG) 510 includes information identifying a vector register in which a output vector generated by LUT vector instruction 500 is to be stored from among a set of available vector registers.

Although LUT vector instruction 500 is shown in FIG. 5 with particular fields, in some implementations, LUT vector instruction 500 includes a different number and/or arrangement of fields. For example, in some implementations, the configuration 504 field is not present or is found in a different location (e.g., at the end of LUT vector instruction 500). As another example, in some implementations, lookup table instruction 500 does not include one or more of the input vector register, the reference vector register, and/or the output vector register. In these implementations, some or all of these vector register identifiers are specified in advance or otherwise known. Generally, LUT vector instruction 500 includes sufficient information to enable the operations herein described.

As described above, the LUT vector instruction (e.g., LUT vector instruction 500) determines whether input values in an input vector meet a specified condition using reference values in a reference vector. Instead of checking the specified condition for each element of the input vector using scalar instructions as is done in existing systems, the LUT vector instruction enables the performance of a "one-instruction" check. This is accomplished by initially setting a reference value in each element of a reference vector to indicate or identify whether (or not) a respective index meets the specified condition. Each input value from the input vector is then used as an index to acquire a corresponding reference value from the reference vector-which can be considered "looking up" the corresponding reference value. The set of acquired reference values includes a respective reference value associated with each input value that identifies whether (or not) the input value meets the specified condition.

Figure 6:
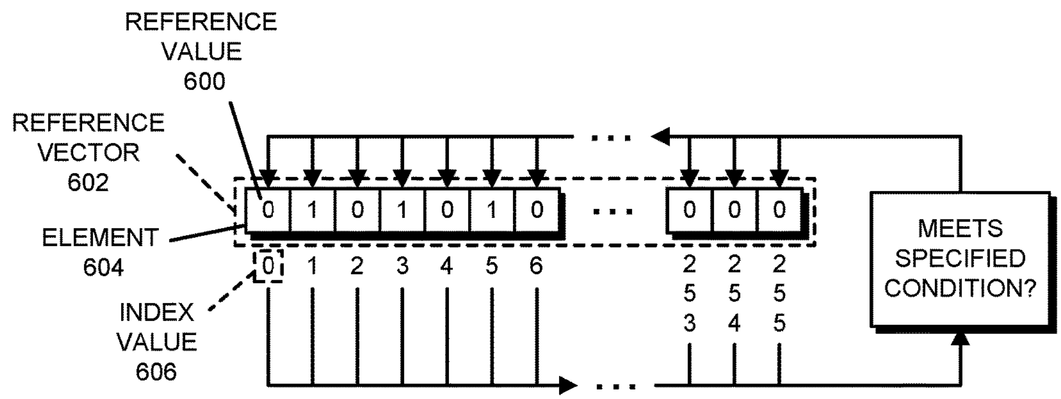
FIG. 6 presents a block diagram illustrating operations for setting reference values in a reference vector in accordance with some implementations.
Figure 7:
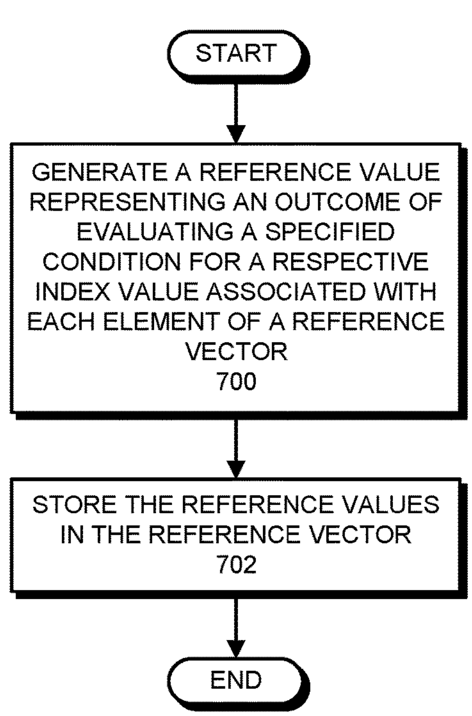
FIG. 7 presents a flowchart illustrating a process for setting reference values in a reference vector in accordance with some implementations.

FIG. 6 presents a block diagram illustrating operations for setting reference values in elements of reference vector 602 in accordance with some implementations. FIG. 7 presents a flowchart illustrating a process for setting reference values in elements of a reference vector (e.g., reference vector 602) in accordance with some implementations. FIG. 6-7 are presented as general examples of operations and a process performed in some implementations. In other implementations, however, different operations and/or processes are performed and/or operations and/or processes are performed in a different order. Additionally, although reference vector 602 is described using a particular arrangement and number of elements and indices, in some implementations, different arrangements and/or numbers of elements and/or indices are used. Generally, in the described implementations, reference values are set in reference vectors to be used as described herein.

As can be seen in FIG. 6, reference vector 602 includes a number of elements (only one of which is labeled element 604 for clarity). Each element is able to store a reference value (only one of which is labeled reference value 600 for clarity). For example, in some implementations, each element includes at least one bit in a vector register or other storage element and the reference value can be stored in the at least one bit. Each element is also associated with an index value (only one of which is labeled index value 606 for clarity). For the example in FIG. 6, reference vector 602 is assumed to be a 256-element vector. The leftmost element of reference vector 602 is associated with the index 0 and each element to the right of this element in sequence is associated with an incrementally higher index up to the rightmost index of 255. Although indices are assumed to be numerical, sequential, and increasing for the example in FIG. 6, in some implementations, other indices and/or other arrangements of indices are used. For example, in some implementations, the index for each element of reference vector 602 is a respective character from among the characters in the ISO basic Latin alphabet and reference vector 602 is 52 elements.

The operations shown in FIG. 7 start when an entity generates a reference value representing an outcome of evaluating a specified condition for a respective index value associated with each element of a reference vector (step 700). For this operation, the entity compares the index value with, measures the index against, and/or otherwise examines the index to determine if the index meets (i.e., agrees with, passes, fulfills, falls within, etc.) the specified condition. For indices that meet the specified condition, the entity generates a reference value that represents a correct, pass, or true outcome, such as a logical one. In contrast, for indices that do not meet the condition, the entity generates a reference value that represents an incorrect, fail, or false outcome, such as a logical zero. For the example in FIG. 6, the specified condition is assumed to be is whether the index is a prime number. As can be seen, therefore, for indices 1, 3, and 5, an outcome of evaluating the specified condition is "true," in that these indices are prime. For these indices, therefore, the entity generates a reference value that represents the true outcome (and would do the same for prime indices that are not shown in FIG. 6, such as 7, 11, 13, etc.). For other indices, including indices 0, 2, 4, 6, 253, etc., an outcome of evaluating the specified condition is "false," in that these indices are not prime. For these indices, therefore, the entity generates a reference value that represents the false outcome (and would do the same for non-prime indices that are not shown in FIG. 6, such as 8, 10, 12, etc.). At the conclusion of this operation, the entity has a set of reference values that includes one reference value for each index in the reference vector—and thus has 256 reference values-that serve as a record of which indices are prime numbers (or not).

The entity then stores the reference values in the reference vector (step 702). For this operation, the entity generates a reference vector that includes the set of reference values. For example, the entity may generate a reference vector that includes a single-bit element for each reference value—and thus is 256 bits. Continuing the example, the reference vector would include the pattern of zero and one values shown in elements of reference vector 602 (which, again, represent whether or not the corresponding index is prime).

Figure 8:
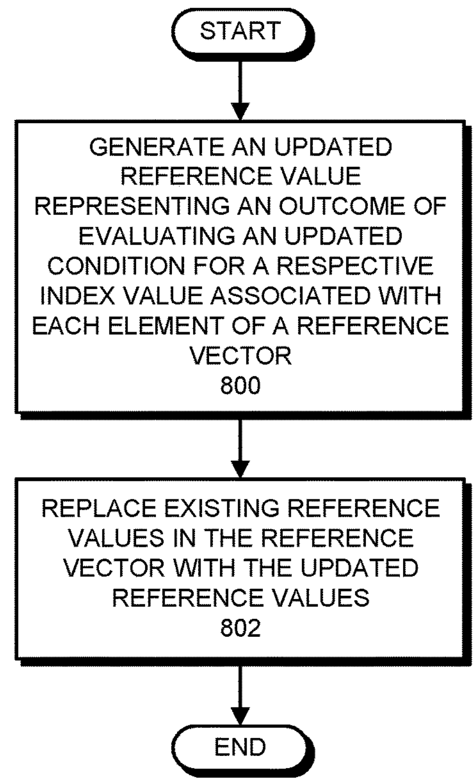
FIG. 8 presents a flowchart illustrating a process for updating reference values in a reference vector in accordance with some implementations.

For the example in FIGS. 6-7, the reference vector is described as being set, without further description of operations on the reference vector. In some implementations, the reference vector is set once and remains unchanged, particularly where the specified condition remains unchanged over time (e.g., whether the indices are prime, are particular characters, etc.). This is not a requirement, however. In some implementations, the reference vector can be dynamically reset one or more times. For example, when the specified condition has changed such as when a particular set of characters is being searched for, etc. FIG. 8 presents a flowchart illustrating a process for dynamically updating reference values in elements of a reference vector (e.g., reference vector 602) in accordance with some implementations. FIG. 8 is presented as a general example of a process performed in some implementations. In other implementations, however, a different process is performed and/or the process is performed in a different order. Generally, in the described implementations, reference values are updated in reference vectors to be used as described herein.

The operations shown in FIG. 8 start when an entity generates an updated reference value representing an outcome of evaluating an updated condition for a respective index value associated with each element of a reference vector (step 800). For this operation, the entity compares the index value with, measures the index against, and/or otherwise examines the index to determine if the index meets (i.e., agrees with, passes, fulfills, falls within, etc.) the updated condition. As was described in more detail for FIG. 7, for indices that meet the updated condition, the entity generates a reference value that represents a correct, pass, or true outcome and otherwise generates a reference value that represents an incorrect, fail, or false outcome. At the conclusion of this operation, the entity has a set of updated reference values that includes one updated reference value for each index in the reference vector. The entity then stores the updated reference values in the reference vector (step 802). For this operation, the entity overwrites an existing reference vector that includes a set of reference values with the updated reference values. At the conclusion of this operation, the reference vector includes, instead of the existing reference values, the updated reference values-thereby redefining the reference vector.

Figure 9:
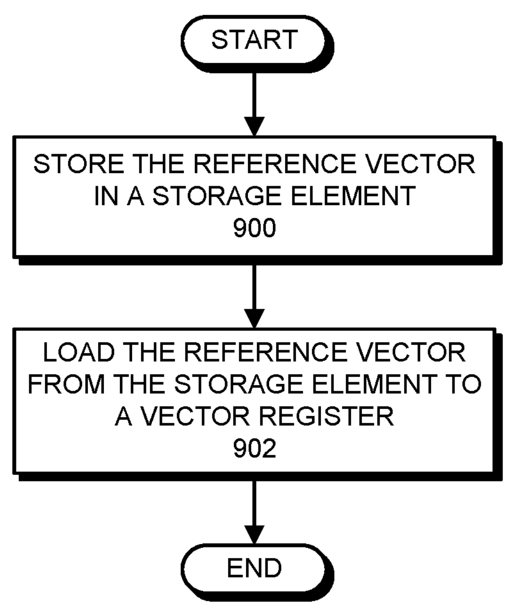
FIG. 9 presents a flowchart illustrating a process for storing or replacing reference values in a reference vector in accordance with some implementations.

In describing FIGS. 7-8, reference values are described as being stored in a reference vector and replaced in the reference vector, respectively. FIG. 9 presents a flowchart illustrating a process for storing or replacing reference values in elements of a reference vector (e.g., reference vector 602) in accordance with some implementations. FIG. 9 is presented as a general example of a process performed in some implementations. In other implementations, however, a different process is performed and/or the process is performed in a different order. The operations in FIG. 9 start when an entity generates/creates a reference vector or replaces reference values in a reference vector as is described above for FIGS. 7-8. The entity then stores the reference vector in a storage element (step 900). For example, the entity can store the reference vector in a mass storage device (e.g., a solid state drive, a disk drive, etc.). The reference vector is then eventually loaded from the storage element to a vector register (step 902). In some implementations, the storing of the reference vector in the storage element and the loading of the reference vector are separate in time (e.g., separated by seconds, hours, weeks, etc.), such as when a programmer includes the reference vector in program code that is subsequently executed by a user. In some implementations, the reference vector can be reused one or more times, i.e., loaded from the storage element to the vector register on two or more different occasions. In some implementations, although the reference vector is described as being stored in a storage element for FIG. 9, the reference vector is generated and stored directly in the vector register—and may never be stored in a storage element (other than the vector register). For example, processing circuitry 102 may generate the reference vector immediately prior to executing a LUT vector instruction—and thus may simply store the reference vector in the vector register from where the reference vector is used as described herein.

In describing FIGS. 6-9, an "entity" is described as performing various operations. This reflects the fact that the same entity does not necessarily always generate the reference vector. In some implementations, processing circuitry 102 is the entity that generates the reference vector, e.g., at some time prior to executing an LUT vector instruction that uses the reference vector or for some other reason. In some implementations, however, a different entity, such as other processing circuitry (including processing circuitry in a different/remote electronic device), a user or programmer, and/or another entity, sets the reference values in reference vector 602 and/or stores reference vector 602. For example, in some implementations, a programmer sets the reference values in reference vector 602 when writing program code that includes LUT vector instructions, a network device communicates reference vector 602 to electronic device 100 with the reference values set, etc. In some implementations, reference vector 602 is set in advance and stored in a storage element (e.g., a volatile or non-volatile memory such as memory 104, a mass storage device, etc.), from where reference vector 602 is loaded for use, as described herein.

Figure 10:
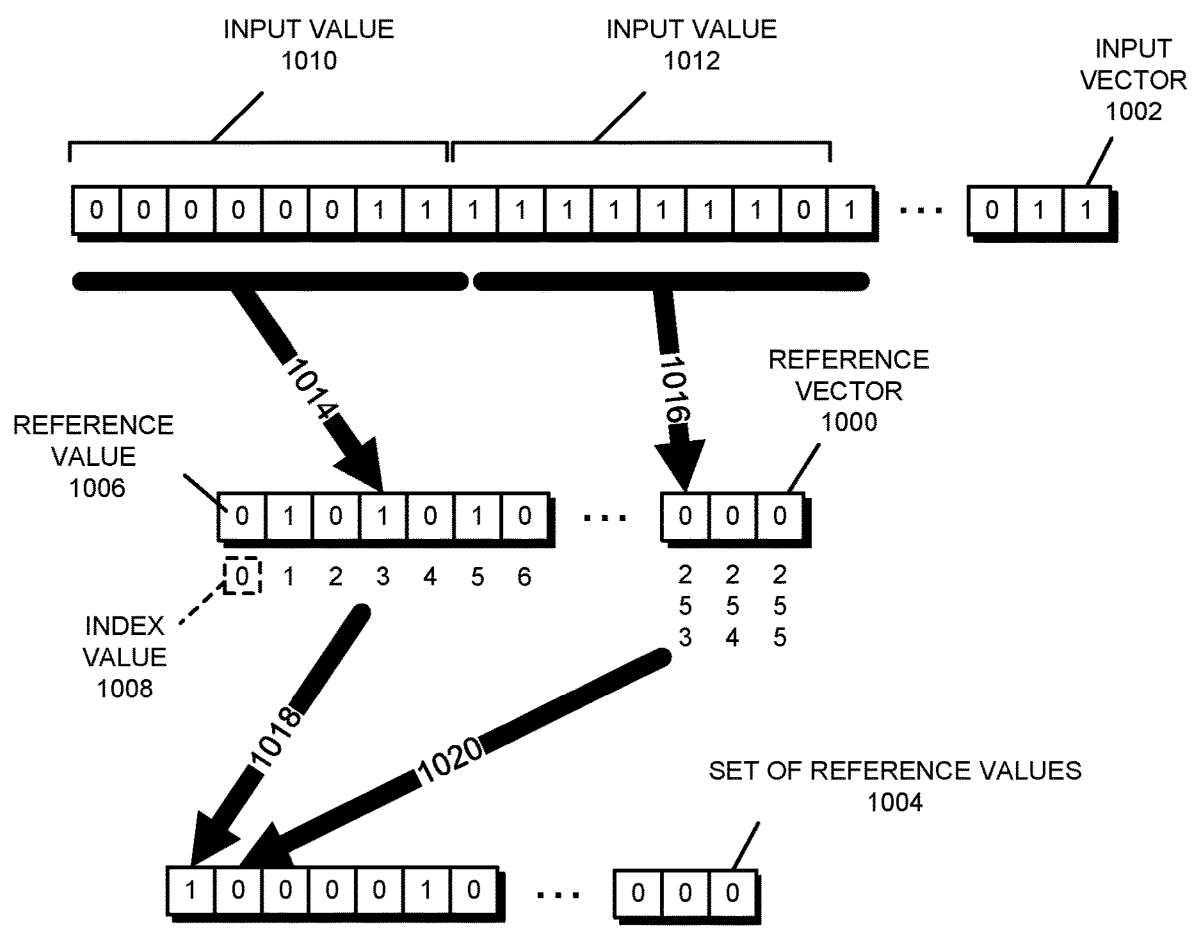
FIG. 10 presents a block diagram illustrating operations performed when executing a lookup table vector instruction in accordance with some implementations.
Figure 11:
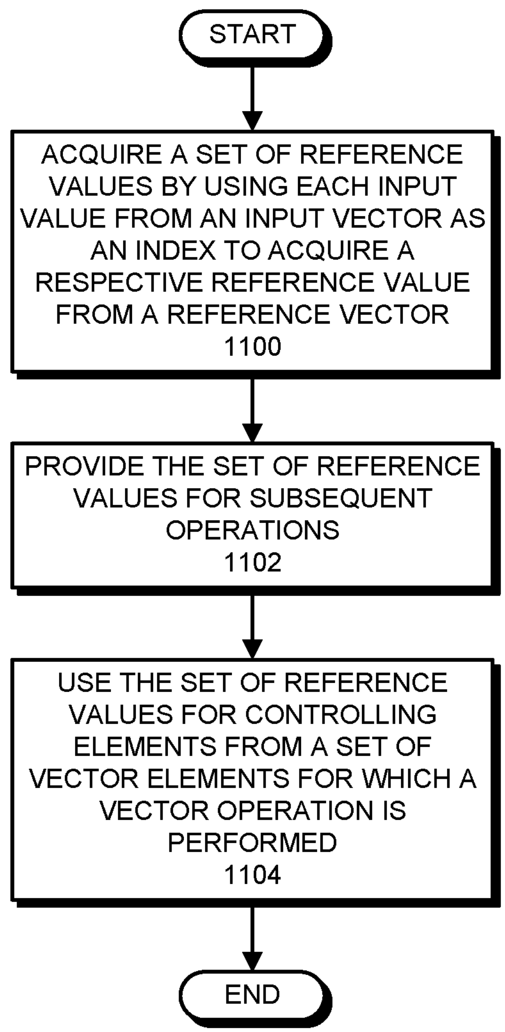
FIG. 11 presents a flowchart illustrating a process for executing a lookup table vector instruction in accordance with some implementations.

In the described implementations, processing circuitry (e.g., vector processing circuitry 202, etc.) executes lookup table (LUT) vector instructions that cause the processing circuitry to acquire, from reference vectors, reference values that indicate whether (or not) input values from an input vector meet a specified condition. FIG. 10 presents a block diagram illustrating operations performed when executing a LUT vector instruction in accordance with some implementations. FIG. 11 presents a flowchart illustrating a process for executing a LUT vector instruction in accordance with some implementations. FIG. 10-11 are presented as general examples of operations and a process performed in some implementations. In other implementations, however, different operations and/or processes are performed and/or operations and/or processes are performed in a different order.

For the example in FIG. 10, reference vector 1000 and input vector 1002 are used as examples. These vectors are shown as a series of boxes, the boxes representing elements of each vector having a single binary bit value (i.e., 0 or 1) included therein. FIG. 10 also includes a set of reference values 1004, which is itself a vector in some implementations, but can be any form of variable such as a list, etc. that is output from the LUT vector instruction. Although reference vector 1000, input vector 1002, and set of reference values 1004 are used as examples for FIG. 10, in some implementations, a different arrangement of reference vector, input vector, and/or set of reference values is/are used. Generally, in the described implementations, a LUT vector instruction causes processing circuitry to perform the operations described herein.

Reference vector 1000, which serves as the reference vector input for the LUT vector instruction, includes a number of reference values (only one reference value 1006 is labeled for clarity). Each of the reference values indicate whether (or not) an associated index value meets a specified condition (only one index value 1008 is labeled for clarity). For the example in FIG. 10, the specific condition is whether an index value is a prime number. The reference values therefore indicate whether the associated index value is a prime number (zero is assumed not to be prime). This can be seen in elements 1, 3, and 5, for which the index value is prime and the reference value is set to one-while the remaining index values shown in FIG. 10 are not prime and the reference value is set to zero. In some implementations, reference vector 1000 is generated via operations similar to those described for FIGS. 7-8, although reference vectors may be generated in other ways.

Input vector 1002, which serves as the input vector input for the LUT vector instruction, includes multiple input values (only two of which are labeled input value 1010 and 1012 in FIG. 10 for clarity). Generally, the input values are to be checked, via the LUT vector instruction, to determine whether the input values meet the specified condition. As described above, for the example in FIG. 10, the specified condition is whether (or not) the input values represent prime numbers. Each of the input values is eight bits/one byte in length and is assumed to be a binary representation of a decimal number. For example, input value 1010, which is 00000011, represents a decimal 3. Generally, there are 256 possible combinations of eight bits and thus the input values can range in value from 0 to 255.

The process in FIG. 11 starts when processing circuitry (e.g., vector processing circuitry 202) acquires a set of reference values (e.g., reference values 1004) by using each input value from an input vector (e.g., input vector 1002) as an index to acquire a respective reference value from a reference vector (step 1100). For this operation, the processing circuitry retrieves each of the input values from the input vector. The processing circuitry then uses each of the input values as an index to acquire a respective reference value from a reference vector (e.g., reference vector 1000). In some implementations, the processing circuitry acquires the reference values for the input values substantially in parallel. That is, using high capacity lookup circuitry (e.g., a crossbar lookup, comparator circuitry, etc.), the processing circuitry looks up the reference values associated with all of the input values at or very close to the same time. Part of this operation is shown in FIG. 10 via arrow 1014, which represents the use of input value 1010 to acquire the reference value of 1 from the element associated with index 3 in reference vector 1000. That is, the lookup circuitry takes input value 1010, i.e., 00000011 or decimal 3, and uses input value 1010 as an index to look up the reference value associated with index decimal 3. The same thing is done, substantially in parallel, with input value 1012, i.e., 11111101, to acquire a reference value of 0 associated with index 253, as shown by arrow 1016. Each of the reference values is added to set of reference values 1004, as can be seen in positions on the left of set of reference values 1004—as shown by arrows 1018 and 1020. The remaining positions of set of reference values 1004 include respective reference values that are acquired in the same way, although the operations for setting these values is not shown in FIG. 10 for clarity.

The processing circuitry then provides the set of reference values for use in subsequent operations (step 1102). Generally, for this operation, the processing circuitry makes the set of reference values available for the subsequent operations. This means forwarding the reference values themselves directly or indirectly to the subsequent operations to be used for those operations. For instance, by signaling the reference values directly or indirectly as inputs to one or more program code instructions (which cause the subsequent operations), storing the reference values in a register or other storage element from where the reference values are available for the subsequent operations, feeding the reference values to circuit elements (e.g., multiplexers, transfer gates, logic circuits, etc.) to serve as control inputs for the circuit elements, using the reference values to update system state, flags, and/or other controls that are used for the subsequent operations, etc.

The processing circuitry then uses the set of reference values for controlling elements from a set of elements for which a vector operation is performed (step 1104). For this operation, the processing circuitry uses each reference value to cause the vector operation to be performed or prevent the vector operation from being performed for the associated elements. For example, in some implementations, the processing circuitry sets one or more control mechanisms so that the vector operation is performed for each vector element for which an associated reference value has a given value (e.g., a logical one value, a true value, etc.) and so that the vector operation is not performed for each vector element for which the associated reference value has a value other than the given value (e.g., a logical zero value, a false value, etc.). In some implementations, the one or more control mechanisms can be or include hardware control mechanisms implemented in circuitry, such as controls on vector lane circuitry, vector mask registers, logic circuitry, enable/disable circuitry, processor registers, flag values, etc. In some of these implementations, the one or more control mechanisms include only hardware control mechanisms—and do not include software control mechanisms. In some implementations, the one or more control mechanisms can be or include software control mechanisms implemented via software, such as program code instructions, variable values, interrupts/faults, branch inputs/conditionals, etc. Some examples of control mechanisms are described in the following paragraphs and shown in FIGS. 12-15.

Figure 12:
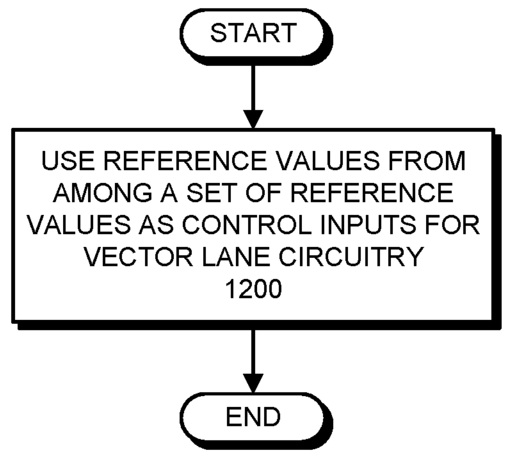
FIG. 12 presents a flowchart illustrating a process for using a set of reference values as control inputs for vector lane circuitry in accordance with some implementations.
Figure 13:
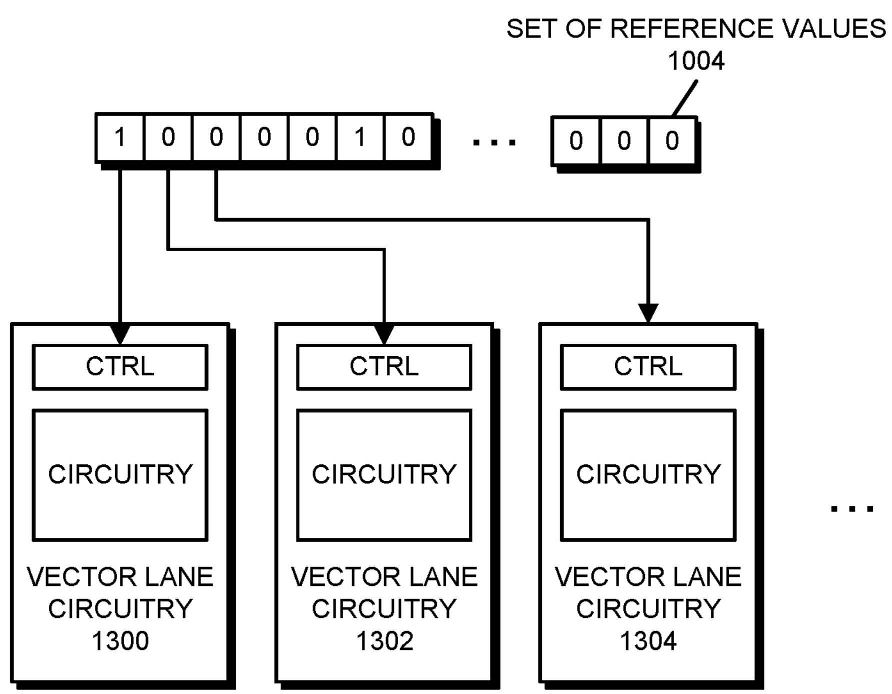
FIG. 13 presents a block diagram illustrating using a set of reference values as control inputs for vector lane circuitry in accordance with some implementations.

As one example of providing the reference values for subsequent operations and using the reference values for controlling elements from a set of elements for which a vector operation is performed, in some implementations, the processing circuitry uses reference values from among the set of reference values as control inputs for vector lane circuitry. In these implementations, the above-described control mechanism includes at least the control inputs for the vector lane circuitry. FIG. 12 presents a flowchart illustrating a process for using a set of reference values as control inputs for vector lane circuitry in accordance with some implementations. FIG. 13 presents a block diagram illustrating using a set of reference values as control inputs for vector lane circuitry (e.g., vector lane circuitry 304) in accordance with some implementations. FIGS. 12-13 are presented as general examples of operations and a process performed in some implementations. In other implementations, however, different operations and/or processes are performed and/or operations and/or processes are performed in a different order. As can be seen in FIG. 12, the process includes using reference values from among the set of reference values as control inputs for vector lane circuitry (step 1200). As can be seen in FIG. 13, each bit of the set of reference values (or at least a logical state thereof), is fed directly or via one or more intermediary circuit elements into control circuitry for vector lane circuitry 1300-1304. Within the control circuitry, the reference values can be used as inputs to circuitry such as transfer gates, multiplexers, logic gates, and/or other circuitry that controls how and/or whether a given vector operation is performed. In some cases, the vector lane circuitry itself is enabled or disabled by the reference value-which can be used to limit/control the vector lanes that perform a given vector operation. Note that only three reference values are shown being forwarded to the control circuitry for three respective vector lanes/vector lane circuitry for clarity, but the remaining reference values are similarly forwarded to respective vector lanes.

Figure 14:
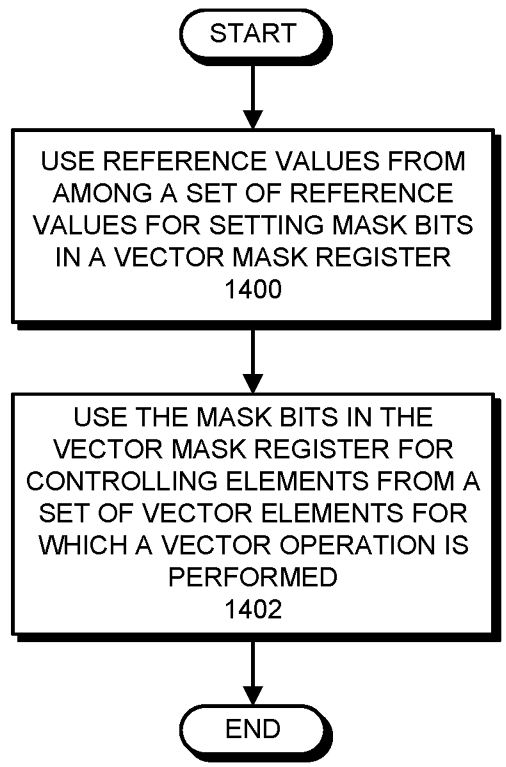
FIG. 14 presents a flowchart illustrating a process for using a set of reference values to set a vector mask register in accordance with some implementations.
Figure 15:
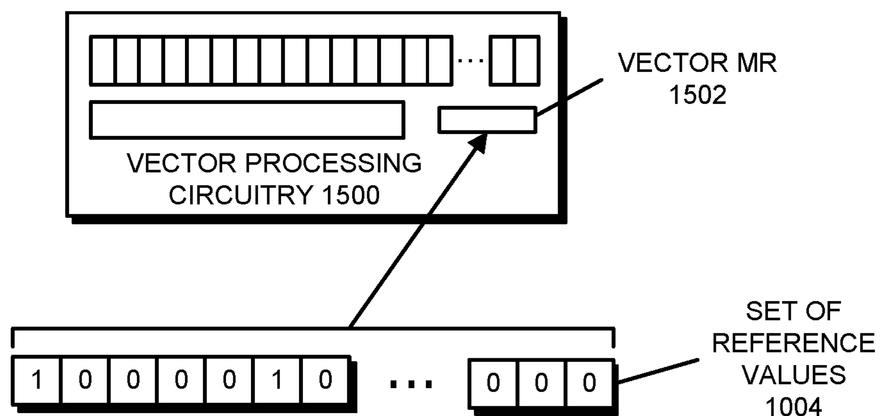
FIG. 15 presents a block diagram illustrating using a set of reference values to set a vector mask register in accordance with some implementations.

As another example of providing the reference values for subsequent operations and using the reference values for controlling elements from a set of elements for which a vector operation is performed, in some implementations, the processing circuitry writes reference values from among the set of reference values to a vector mask register. The vector mask register can then be used as a control input for vector lane circuitry—or otherwise used for controlling vector operations. The reference values in this case are used "indirectly," i.e., via the vector mask register, for the subsequent operations. In these implementations, the above-described control mechanism includes at least the vector mask register. FIG. 14 presents a flowchart illustrating a process for using the set of reference values to set a vector mask register that is used for controlling subsequent operations in accordance with some implementations. FIG. 15 presents a block diagram illustrating using the set of reference values to set a vector mask register (e.g., vector mask register 306) in accordance with some implementations. FIGS. 14-15 are presented as general examples of operations and a process performed in some implementations. In other implementations, however, different operations and/or processes are performed and/or operations and/or processes are performed in a different order. As can be seen in FIG. 14, the process starts with processing circuitry using reference values from among the set of reference values for setting mask bits in a vector mask register (step 1400). As can be seen in FIG. 15, each reference value from the set of reference values (or at least a logical state thereof), are stored in vector mask register 1502 (which can be similar to vector mask register 306 in form and function) in vector processing circuitry 1500. The processing circuitry then uses the mask bits in the vector mask register for controlling elements from a set of vector elements for which a vector operation is performed (step 1402). For this operation, the processing circuitry uses the reference values in vector mask register 1502 for setting control circuitry (e.g., control 402 in instance(s) of vector lane circuitry 304) so that the vector operation is performed (or not) for elements from a set of vector elements for which a vector operation is performed. In some implementations, the subsequent operations are performed by the vector processing circuitry upon executing vector instructions that follow, i.e., are subsequent to, a LUT vector instruction.

In some implementations, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, vector and/or scalar processing circuitry, compute units, embedded processors, accelerated processing units (APUs), controllers, network communication links, and/or other functional blocks. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression “et cetera” or “etc.” as used herein is intended to present an and/or case, i.e., the equivalent of “at least one of” the elements in a list with which the etc. is associated. For example, in the statement “the electronic device performs a first operation, a second operation, etc.,” the electronic device performs at least one of the first operation, the second operation, and other operations. In addition, the elements in a list associated with an etc. are merely examples from among a set of examples—and at least some of the examples may not appear in some implementations, despite appearing in the list. In addition, the expression “and/or” is intended to mean the “at least one” of case.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. An electronic device, comprising:

processing circuitry configured to:

receive an instruction for checking whether input values of an input vector meet a condition for executing a vector operation; and execute the instruction to:

map a set of reference values of a reference vector to respective input values of the input vector, the reference vector having been generated prior to the instruction being executed; and set control circuitry in vector lanes of the processing circuitry based on the set of reference values to control whether the vector operation is executed on the respective input values of the input vector.

2. The electronic device of claim 1, wherein each input value of the input values is associated with a corresponding reference value of the set of reference values that indicates whether a respective input value meets the condition.

3. The electronic device of claim 1, wherein:

each of the vector lanes are configured to perform the vector operation for a respective input value of the input values, and to set the control circuitry in the vector lanes, the processing circuitry is configured to map the set of reference values to the control circuitry in the vector lanes of the respective input values of the input vector.

4. The electronic device of claim 1, further comprising a vector mask register having a set of mask bits, each mask bit being used for controlling whether the vector operation is performed for a respective input value.

5. The electronic device of claim 1, wherein:

the reference vector includes a set of elements, each element being associated with a respective index value; and the processing circuitry is further configured to, for each element in the reference vector:

generate a given reference value representing an outcome of evaluating the condition for the respective index value associated with that element of the reference vector; and store the given reference value in that element of the reference vector.

6. The electronic device of claim 5, wherein the condition is or includes logical, bitwise, and/or mathematical conditions.

7. The electronic device of claim 5, wherein the processing circuitry is further configured to, for each element in the reference vector:

generate an updated reference value representing an outcome of evaluating an updated condition for the respective index value associated with that element of the reference vector; and replace an existing reference value in that element of the reference vector with the updated reference value.

8. The electronic device of claim 5, wherein to map the set of reference values, the processing circuitry is configured to:

retrieve the reference vector from a memory device; and store the reference vector in a reference vector register in preparation for executing the vector operation.

9. The electronic device of claim 1, wherein the processing circuitry executes a single instruction from an instruction set to check whether the input values meet the condition, the single instruction corresponding to the instruction.

10. A method, comprising:

receiving an instruction for checking whether input values of an input vector meet a condition for executing a vector operation; and executing the instruction by:

mapping a set of reference values of a reference vector to respective input values of the input vector, the reference vector having been generated prior to the instruction being executed; and setting control circuitry in vector lanes of processing circuitry based on the set of reference values to control whether the vector operation is executed on the respective input values of the input vector.

11. The method of claim 10, wherein each input value of the input values is associated with a corresponding reference value of the set of reference values that indicates whether a respective input value meets the condition.

12. The method of claim 11, wherein setting the control circuitry for a vector lane associated with a particular input value includes mapping the corresponding reference value of the particular input value to the vector lane.

13. The method of claim 10, wherein setting the control circuitry of a vector lane includes setting a mask bit corresponding to the vector lane in a vector mask register.

14. The method of claim 10, further comprising: for each element in the reference vector:

generating a given reference value representing an outcome of evaluating the condition for a respective index value associated with that element of the reference vector; and storing the given reference value in that element of the reference vector.

15. The method of claim 14, wherein the processing circuitry is further configured to, for each element in the reference vector:

generate an updated reference value representing an outcome of evaluating an updated condition for the respective index value associated with that element of the reference vector; and replace an existing reference value in that element of the reference vector with the updated reference value.

16. A computer readable storage medium storing instructions that, when executed by processing circuitry, causing the processing circuitry to:

receive an instruction for checking whether input values of an input vector meet a condition for executing a vector operation; and execute the instruction to:

map a set of reference values of a reference vector to respective input values of the input vector, the reference vector having been generated prior to the instruction being executed; and set control circuitry in vector lanes of the processing circuitry based on the set of reference values to control whether the vector operation is executed on the respective input values of the input vector.

17. The electronic device of claim 1, wherein to map the set of reference values, the processing circuitry is configured to use each input value from the input vector as an index to acquire a reference value from the reference vector.

18. The method of claim 10, wherein mapping the set of reference values includes loading the set of reference values from a memory device to a vector mask register.

19. The method of claim 18, wherein setting the control circuitry includes forwarding the set of reference values from the vector mask register to the control circuitry.

20. The method of claim 19, wherein forwarding the set of reference values includes mapping a particular reference value corresponding to a particular input value to the control circuitry of a particular vector lane configured to execute the vector operation on the particular input value.

* * * * *